United States Patent [19]

Barclay et al.

[11] Patent Number: 5,315,782
[45] Date of Patent: May 31, 1994

[54] SUPPORT DEVICE FOR SUPPORTING PLANTS

[76] Inventors: William M. Barclay, R.D. 3 Drury, Auckland; Peter W. F. Stenhouse, 103 Portland Road, Remuera, Auckland, both of New Zealand

[21] Appl. No.: 962,050

[22] Filed: Oct. 16, 1992

Related U.S. Application Data

[63] Continuation of Ser. No. 766,971, Sep. 26, 1991, abandoned, which is a continuation of Ser. No. 434,560, Nov. 13, 1989, abandoned, which is a continuation of Ser. No. 97,642, Sep. 16, 1987, abandoned.

[30] Foreign Application Priority Data

Sep. 16, 1983 [NZ] New Zealand .................. 217595

[51] Int. Cl.$^5$ .................. A47G 7/07; A01G 5/06
[52] U.S. Cl. .................. 47/41.12; 47/41.11
[58] Field of Search .................. 47/59–64, 47/77, 48.5, 84, 41.01, 41.1, 41.12, 41.13, 41.15, DIG. 3

[56] References Cited

U.S. PATENT DOCUMENTS

| 1,828,295 | 10/1931 | Roy | 47/41.11 |
|---|---|---|---|
| 1,851,205 | 3/1932 | Nagai | 47/41 SS |
| 2,453,906 | 11/1948 | Hamlet | 47/41.15 X |
| 3,003,284 | 10/1961 | Smithers | 47/41.12 |
| 3,457,673 | 7/1969 | Shupe et al. | 47/41.12 X |
| 3,552,059 | 1/1971 | Moore . | |
| 3,874,115 | 4/1975 | London et al. | 47/41.11 |
| 3,912,496 | 10/1975 | Fawzi et al. | 71/92 |
| 4,103,457 | 8/1978 | Carlisle | 71/68 X |
| 4,238,374 | 12/1980 | Durham et al. | 47/41.1 |
| 4,241,537 | 12/1980 | Wood | 47/84 X |
| 4,584,213 | 4/1986 | Rentowl . | |
| 4,586,288 | 5/1986 | Walton . | |

FOREIGN PATENT DOCUMENTS

| 2232181 | 1/1973 | Fed. Rep. of Germany . | |
|---|---|---|---|
| 8001042 | 9/1981 | Netherlands | 47/41.12 |
| 71386 | 12/1946 | Norway | 47/41.12 |
| WO86/05065 | 9/1986 | PCT Int'l Appl. . | |
| 1291830 | 10/1972 | United Kingdom . | |
| 1455861 | 11/1976 | United Kingdom | 47/41 |
| 2024772A | 5/1979 | United Kingdom . | |
| 1562239 | 3/1980 | United Kingdom . | |
| 2088184A | 11/1980 | United Kingdom . | |

Primary Examiner—Danton D. DeMille
Attorney, Agent, or Firm—Wenderoth, Lind & Ponack

[57] ABSTRACT

A method and device for supporting cut plants is disclosed. A flexible walled pouch is provided having a moisturized gel medium therein. The wall of the pouch is formed of a material which will resist accidental tearing or puncturing, yet enables the wall to be punctured to insert a plant material through the puncture. The material of the wall receiving the puncture can either be a nylon and polyethylene laminate or a wall panel formed of a polyurethane foam material. Both of these materials serve to seal around the plant material when the plant material is inserted through the puncture. The moisturized gel material may comprise a water and starch mixture.

8 Claims, 1 Drawing Sheet

SUPPORT DEVICE FOR SUPPORTING PLANTS

This application is a Continuation of now abandoned U.S. application Ser. No. 07/766,971, filed on Sep. 26, 1991, which was a Continuation of now abandoned U.S. application Ser. No. 07/434,560, filed Nov. 13, 1989 which in turn was a Continuation of now abandoned U.S. application Ser. No. 07/097,642 filed Sep. 16, 1987.

BACKGROUND OF THE INVENTION

1. Field of the Invention

This invention relates to a support device for plants and/or a method of supporting plants, and in particular cut plants.

2. Description of the Prior Art

When transporting cut plants there is a tendency for those plants to lose their freshness at a quick rate. Attempts have been made to enhance or prolong the freshness of the cut plants, for example, by providing a vial of water with an aperture at the mouth through which aperture the stem of the cut plant is positioned. The aperture may be in a membrane closing the mouth of the solid vial. Such a construction forms part of the disclosure of German patent specification 2232181. Such constructions have disadvantages however, for example, there can be a tendency for the devices to leak, particularly, in the area where the membrane is placed over the rigid structure. Also, the device can take up substantial space when the plant is packaged, and it can be awkward to insert the plant into the aperture, which may not be of a suitable size. Thus it is necessary to, in general, make the aperture somewhat smaller than the expected plant stem diameter. The difficulties make such a construction disadvantageous.

OBJECTS OF THE INVENTION

It is therefore an object of the present invention to provide a support device for plants and/or a method of supporting plants which will go at least some distance towards obviating or minimizing the foregoing disadvantages or which will at least provide the public with a useful choice.

SUMMARY OF THE INVENTION

Accordingly, in one aspect the invention consists in a support device for plants comprising a flexible walled pouch and a medium within the pouch, the wall of the pouch being formed of a material which will resist accidental tearing or puncturing, yet enable the wall to be punctured at a selected time for insertion of plant material through the puncture in such a manner that the material defining the puncture substantially seals to the plant material.

In a further aspect the invention consists in a method of supporting plants comprising the steps of providing a flexible walled pouch with a medium therein, the wall of the pouch being formed of a material which will resist accidental tearing or puncturing, yet enable the wall to be punctured at a selected time, puncturing the wall of the pouch and inserting plant material through the puncture in a manner such that the material defining the puncture substantially seals to the plant material.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying drawings in which.

DETAILED DESCRIPTION OF THE INVENTION

Figure 1:
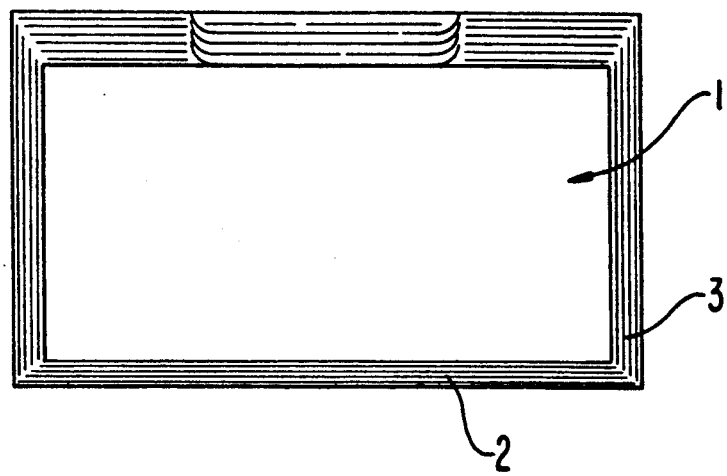
FIG. 1 is a diagrammatic side elevation of a pouch forming a support device according to one preferred form of the invention.
Figure 2:
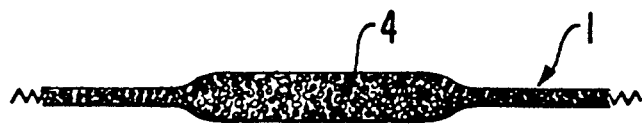
FIG. 2 is a diagrammatic plan view of the pouch of FIG. 1.
Figure 3:
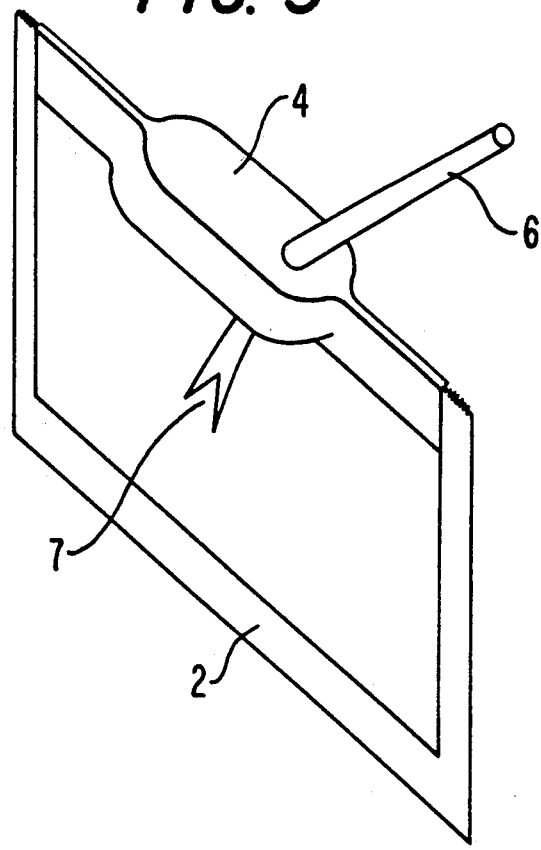
FIG. 3 is a view of a pouch according to one preferred form of the invention showing a member inserted therein.

Referring to the drawings a support device for plants and/or a method of supporting plants are provided as follows.

The support device comprises a container or pouch 1 which contains a medium appropriate to the purpose such as a moisturized gel. The pouch 1 in the disclosed form is rectangular in shape and a suitable size has been found to be 10 cm by 5.5 cm although clearly different sizes and shapes could be used. The preferred pouch is relatively flat, although of course the contents within the pouch will cause some bulging of the walls. The pouch is desirably made from an uncoated nylon/polythene laminate. The uncoated nylon being, for example, 15 $\mu$m in thickness and the polythene being for example, 50 $\mu$m in thickness. This material has properties which enables it to resist accidental tearing or puncturing whilst yet allowing the material to be punctured if desired at a desired time in a manner such that a substantially liquid and airtight seal will be formed around a plant stem inserted into the aperture formed by puncturing. This material also has properties which enable it to be heat sealed. Thus the pouch may be formed by folding the material substantially in half about a fold line 2 and forming a heat sealed area 3 around the remaining three sides. Alternatively, the pouch may be formed by heat sealing around all four sides so that two panels may be connected to form the sachet.

The moisturized gel contained within the pouch desirably is in the form of a liquid formed by a mix of a powder and preferably pure water such as deionized water. A suitable powder is sold under the trade mark AUSTRASORB grade 3 and is manufactured by Agrisob Pty. Limited, of 144 Riley Street,-East Sydney, New South Wales, Australia. This material is a biodegradable, non toxic, environmentally safe, super absorbent material. It is a starch grafted material with an organic filler added and is provided in the form of a white powder. The material will take up moisture but release it on demand to plant material in the immediate vicinity. A suitable mix of this powder and water is obtained by mixing at the rate of 300 grams of powder to 180 liters of water. This forms a mixture having a fluid paste consistency. Each pouch desirably contains between about 15 to 45 ml of the mixture. The grain size of the unmixed powder is about 0.5 mm. The above is a suitable material for the medium within the pouch but of course other materials having suitable properties may be used.

In the preferred embodiment, shown in the drawings, rather than requiring the wall of the pouch to be punctured, a puncturable insert or membrane is provided in the pouch, and this may best be achieved by inserting a strip 4 of puncturable material along one edge of the sachet 1, for example by inserting between the sides of the sachet 1. A closed cell foam plastics material is preferred, such as medium density polyethylene foam such as that sold under the trade name JIFFYCELL. The strip 4 can be about 1 cm deep and about 1 cm wide at the widest point. The above material is easily penetrable but will close onto for example a plant stem to the desired degree. If the foam is too dense penetration may be difficult and if too light then sealing onto the plant stem may not be adequate or the insert 4 may disintegrate in use.

The pouch above described is used by puncturing a hole in the insert 4 thereof, for example, by use of a suitable member such as a sharpened pencil. Into the hole so formed a stem 6 is then inserted and the material has the advantage that it will form substantially a seal around the stem 6 where it passes through the aperture.

The pouches can be produced on any suitable machine, for example, a TOYO automatic packaging machine, model M-10N, which is modified for liquid filling by the addition of a fluid pump and pipe work. The apparatus is manufactured by the Toyo Packaging Machine Manufacturing Company Limited, 1-11, 7-Chome, Kaminhigashi, Hirono-ku, Osaka, Japan.

The use of the invention is as follows.

In use, plant material can be inserted through a preformed puncture as above described. The plant material can then be transported or alternatively the construction can be used, for example, for the propagation of plants. In this use however the insert could be open celled to allow air circulation. For transportation the freshness of the cut plant material is prolonged or enhanced because of the supply of moisture to the plant through the cut end 7 of the stem 6.

Where used for propagation purposes it is desirable to add suitable nutrients and material such as a root growth hormone to the gel so as to assist the propagation of the plant material.

Thus it can be seen that at least in the preferred form of the invention a supporting device for plants, and/or a method of supporting plants is provided which has some advantages. Because of the properties of the material from which the package can be formed there is little tendency for leakage to occur at the joint between the material defining the boundaries of the puncture and the stem. The tendency to leak is reduced by the fact that it is a gel material within the sachet. For transportation also, the package, because it is flexible, will tend to mold into the available space, which makes the pouch more easily accommodated than a rigid vial.

The pouch is also substantially straight-forward to apply to a plant, requiring only a simple puncturing movement to form a hole and the pushing of a stem therethrough.

What is claimed is:

1. A support device for plants, comprising:
   a pouch forming a space and having two wall portions, said wall portions being made of a flexible material and disposed so as to face each other, each said wall portion having a periphery along which said wall portion is adhered to the other said wall portion such that said wall portions together define said space of said pouch therebetween;
   a plant medium contained within said space of said pouch; and
   a panel that is rigid relative to said flexible material of said two wall portions and is made of a cellular foam material, said panel being disposed between said two wall portions and adhered to said two wall portions on opposite sides thereof, such that said space between said two wall portions containing said plant medium is enclosed and separated and substantially sealed from the external environment by said panel, said panel being made of a material that is puncturable to form a puncture, yet that enables a plant material inserted through the puncture formed to substantially seal said space in said pouch from the external environment about the plant material;
   wherein said pouch, being formed by said two wall portions made of a flexible material, is collapsible so as to collapse as said plant medium is taken up by a plant material.

2. The support device of claim 1, wherein:
   both said wall portions are rectangular, and said periphery includes top and bottom portions and side portions;
   said wall portions are adhered directly to each other at least along said side portion of said peripheries thereof; and
   said panel is disposed between said wall portions along said top portion of said periphery.

3. The support device of claim 2, wherein said two wall portions are portions of a single sheet of said flexible material folded to form a fold, the fold being located at said bottom portion of said periphery of each said wall portion.

4. The support device of claim 3, wherein said flexible material of said wall portions is made of an uncoated nylon and polyethylene laminate.

5. The support device of claim 2, wherein said two wall portions are adhered to each other along said bottom portions thereof.

6. The support device of claim 5, wherein said flexible material of said wall portions is made of an uncoated nylon and polyethylene laminate.

7. The support device of claim 2, wherein:
   both said wall portions are rectangular, and said periphery includes top and bottom portions and side portions;
   said wall portions are adhered directly to each other at least along said side portion of said peripheries thereof; and
   said panel is disposed between said wall portions along said top portion of said periphery.

8. The support device of claim 1, wherein said flexible material of said wall portions is made of an uncoated nylon and polyethylene laminate.

* * * * *